UNITED STATES PATENT OFFICE.

JOHN R. EOFF, JR., OF WASHINGTON, DISTRICT OF COLUMBIA.

PROCESS OF MANUFACTURING GLYCEROL.

1,288,398.    Specification of Letters Patent.    Patented Dec. 17, 1918.

No Drawing.    Application filed July 21, 1917. Serial No. 181,936.

(DEDICATED TO THE PUBLIC.)

*To all whom it may concern:*

Be it known that I, JOHN R. EOFF, Jr., a citizen of the United States, and an employee of the Bureau of Internal Revenue, United States Treasury Department, a legal resident of the District of Columbia, residing in the city of Washington, therein, (whose post-office address is 725 Shepherd street N.W.,) have invented a new and useful Process of Manufacturing Glycerol, and have made application, by petition of even date herewith, under the act of March 3rd, 1883, chapter 142, (22 Stat., 625,) praying that Letters Patent may be granted to me therefor.

The invention herein described and claimed may be used by the Government of the United States or by any of its officers and employees in the prosecution of work for the United States, or by any person in the United States, without payment of any royalty thereon.

My invention relates to the manufacture of glycerol by fermentation of any fermentable sugar in the presence of alkali.

It is well known that ordinary yeast fermentation is usually carried on in acid reacting media, and that, in such media, a small amount of glycerol is obtained as a by-product, but this amount is so small as not to be of value commercially.

By my process I ferment solutions of fermentable sugars in such a way that up to 20 or 23% of the fermentable sugar present is transposed into glycerol. As a result of my investigations I confidently believe that these amounts can be largely increased. Among other products produced are acetic acid, alcohol and acetone.

I have used in this process pure culture yeasts of both the *Cerevisiae* and *Ellipsoideus* species, but obtain the best results from the *Ellipsoideus* variety Steinberg, or the wine yeasts, known to the trade as California wine yeasts. However, I do not wish to limit myself herein to either the specific yeasts, or sugars named, since I believe that any fermentable sugar, and any yeast capable of acclimation in an alkaline medium, will produce the same results, in kind, if not in amount.

My process is as follows:

The yeasts, of the varieties named, are first cultivated in sterile grape juice; and, when in vigorous growth, this is added to a culture medium made by boiling malt sprouts in water, filtering and condensing it to a density of 4° Balling, to which is added 20% dextrose sugar, and yeast food consisting of any of the well known solutions of inorganic salts, such as Pasteur's solution, or those used for similar purposes, and containing ammonium nitrate, potassium phosphate, ammonium phosphate, magnesium sulfate, and traces of zinc and iron salts.

When fermentation is in vigorous progress, sodium or potassium carbonate, or any equivalent, non-antiseptic alkali, is added from time to time until the total amount added to 100 c. c. equals about that which would require 19 c. c. normal hydrochloric acid for neutralization.

When the yeast in this culture medium is in vigorous action it is transferred to a larger quantity of the same medium in order to obtain a larger amount of "starter" for the final transfer to the material to be fermented. This second culture medium is also made alkaline in the same way and to the same degree as the first one, as above related.

The main liquid to be fermented for the production of glycerol is made as follows:

Malt sprouts are extracted in water gradually heated to 190° F. for one-half hour, then the resulting extract is cooled and filtered free from the residue, and brought to a density of between 1° to 4° Balling, and to this is added 18 to 20% dextrose in solution. The malt sprouts furnish albuminoids and mineral salts to the wort, which serve as yeast nutrients.

To this wort, cooled to a fermentation temperature, which I have found to range between 27° and 50° C., although the optimum temperature is 37° C., I add a small amount of sodium carbonate, or equivalent alkali to render it slightly alkaline in reaction; then from one to two per cent. of the "starter" described above, and allow fermentation to proceed, adding alkali from time to time, so that the final amount of alkali added to 100 c. c. is equivalent to about 95 c. c. normal hydrochloric acid, the temperature being maintained all the time as near as possible to 37° C. I have succeeded in conducting fermentation of such a solution, and producing glycerol, when sodium carbonate has been added to the amount of 5% of the solution, and with other alkaline reacting substances in equivalent proportions, and it seems that the amount of glycerol produced is in some proportion to the amount of alkali present in the wort, up to the limit at which the yeast is able to develop. It is not material as to the inorganic salt used to produce the alkalinity so long as it is not antiseptic in its nature, and sodium and potassium carbonates, phosphates and hydroxids may be used, but I prefer to use sodium carbonate because it is comparatively cheap and easily obtainable. I have succeeded in producing glycerol in fair amounts with calcium carbonate instead of the stronger alkalis named above.

As another material to be fermented or used as a source of fermentable sugar, I may use molasses, and find that the ordinary molasses known under the trade name of "Black strap" gives good results, although any similar substance which contains fermentable sugar may be substituted; for instance, properly purified and neutralized waste sulfite liquor. By properly purified waste sulfite liquor I mean that it shall be free from sulfurous acid, or antiseptic substances, and of the character of that used in well known processes for the manufacture of ethyl alcohol by fermentation.

I have found, however, that the best results are obtained, when using "Black strap" molasses, if the fermentation is allowed to begin in the molasses while it is slightly acid in reaction, in order that the invertase of the yeast may have opportunity to invert the sucrose present, and after the fermentation has vigorously begun to add, gradually, alkali until the limits above indicated have been attained.

The molasses should be diluted until it contains about 11% total sugar, at which dilution 20% of the sugar is changed into glycerol by my process, but I am confident that further experience will enable me to largely increase this amount.

The glycerol can be obtained from the fermented wort by any of the well known processes for removal of glycerol from liquids, but this is no part of my invention.

It is understood that the statements of amounts and specific substances made in this specification are not limiting, but simply illustrative, and that not only these specific substances and amounts and proportions, but all equivalents and modifications within the limits of the claims are included within my invention and the protection of the patent for whose issue I have petitioned.

I claim:—

1. The process of producing glycerol, which consists in fermenting a solution of fermentable sugar in an alkaline reacting medium.

2. The process of producing glycerol which consists in fermenting a solution of fermentable sugar in an alkaline reacting medium whose degree of alkalinity is maintained just short of that which will inhibit further fermentation by means of successive additions of an alkaline reacting substance.

3. The process of producing glycerol by fermentation which consists in adding a vigorously fermenting grape juice to a solution of a fermentable sugar, and, after vigorous fermentation has been established in the resulting mixture, rendering the mixture alkaline by successive additions of increasing amounts of an alkaline reacting substance until the degree of alkalinity produced is just short of that which will inhibit further fermentation, and maintaining this degree of alkalinity by continuing the addition of small amounts of an alkaline reacting substance.

4. The process of producing glycerol by fermentation which consists in adding a vigorously fermenting solution of a fermentable sugar to a solution of molasses containing a fermentable sugar, and, after vigorous fermentation has become established in the resulting mixture, rendering the mixture alkaline by successive additions of increasing amounts of an alkaline reacting substance, until the total degree of alkalinity is just short of that which will inhibit further fermentation, and maintaining that degree of alkalinity by continuing the addition of small amounts of an alkaline reacting substance.

5. The process of producing glycerol which consists in cultivating yeast in a solution of fermentable sugar until vigorous fermentation has been established, adding this vigorously fermenting mixture to a larger volume of fermentable sugar, permitting vigorous fermentation to become established in this larger amount, then gradually making this solution alkaline to the degree of alkalinity which is just short of that necessary to inhibit further fermentation, and maintaining this degree of alkalinity throughout the further course of the fermentation.

In witness whereof I have herewith set my hand on this the 21st day of July 1917.

JOHN R. EOFF, Jr.

Witnesses:
　E. D. BATCHELDER,
　C. S. KUNKLE.